(12) United States Patent
Nelson (10) Patent No.: US 7,176,691 B2
(45) Date of Patent: Feb. 13, 2007

(54) SWITCHED COIL RECEIVER ANTENNA FOR METAL DETECTOR

(75) Inventor: Carl V. Nelson, Derwood, MD (US)

(73) Assignee: Johns Hopkins University, Baltimore, MD (US)

(*) Notice: Subject to any disclaimer, the term of this patent is extended or adjusted under 35 U.S.C. 154(b) by 293 days.

(21) Appl. No.: 10/942,153

(22) Filed: Sep. 16, 2004

(65) Prior Publication Data
US 2006/0006873 A1    Jan. 12, 2006

Related U.S. Application Data

(60) Provisional application No. 60/503,235, filed on Sep. 16, 2003.

(51) Int. Cl.
*G01V 3/10* (2006.01)
(52) U.S. Cl. ........................ 324/327; 324/329
(58) Field of Classification Search ................ 324/323, 324/326, 329, 228, 234, 239, 243, 207.26; 336/137, 143, 144, 146, 147, 180; 340/540, 340/551, 568.1, 686.6, 572.7; 343/867, 868, 343/743
See application file for complete search history.

(56) References Cited

U.S. PATENT DOCUMENTS

| | | | | |
|---|---|---|---|---|
| 972,004 A * | 10/1910 | Marriott | ..................... | 178/116 |
| 1,554,328 A * | 9/1925 | Brenner | ..................... | 343/867 |
| 4,358,769 A * | 11/1982 | Tada et al. | ..................... | 343/742 |
| 5,428,363 A * | 6/1995 | D'Hont | ..................... | 343/742 |
| 6,181,249 B1 * | 1/2001 | Maitin et al. | ............. | 340/572.3 |
| 6,333,723 B1 * | 12/2001 | Locke | ..................... | 343/895 |
| 6,456,079 B2 * | 9/2002 | Ott et al. | ..................... | 324/327 |
| 6,636,044 B2 * | 10/2003 | Candy | ..................... | 324/329 |
| 6,653,838 B2 * | 11/2003 | Candy | ..................... | 324/329 |
| 7,030,759 B2 * | 4/2006 | Nelson | ..................... | 340/551 |

\* cited by examiner

*Primary Examiner*—Edward Lefkowitz
*Assistant Examiner*—Kenneth J. Whittington
(74) *Attorney, Agent, or Firm*—Albert J. Fasulo, II

(57) ABSTRACT

A pulse induction metal detector includes a pulse transmitter coil for generating and transmitting a first electromagnetic signal and a receiver coil for detecting and amplifying a second electromagnetic signal emitted by a nearby metal target due to eddy currents generated in response to the first electromagnetic signal. The receiver coil is a coil of wire having multiple loops. At least one switch is coupled with the coil of wire such that when the switch is in its open position, the coil of wire is a broken circuit. In this condition, the inductive properties of the receiver coil are minimized during abrupt transmitter coil turn off. The number of switches per coil loop can be varied to achieve varying levels of sensitivity.

22 Claims, 9 Drawing Sheets

SWITCHED COIL RECEIVER ANTENNA FOR METAL DETECTOR

CROSS-REFERENCE TO RELATED APPLICATIONS

This application claims the benefit of U.S. provisional application No. 60/503,235, filed on Sep. 16, 2003, which is incorporated herein by reference in its entirety.

STATEMENT OF GOVERNMENTAL INTEREST

This invention was made with U.S. Government support under Army contract no. DAAB-15-00-C-1008 and Navy contract no. N00024-98-D-8124. The U.S. Government has certain rights in this invention.

BACKGROUND

Figure 1:
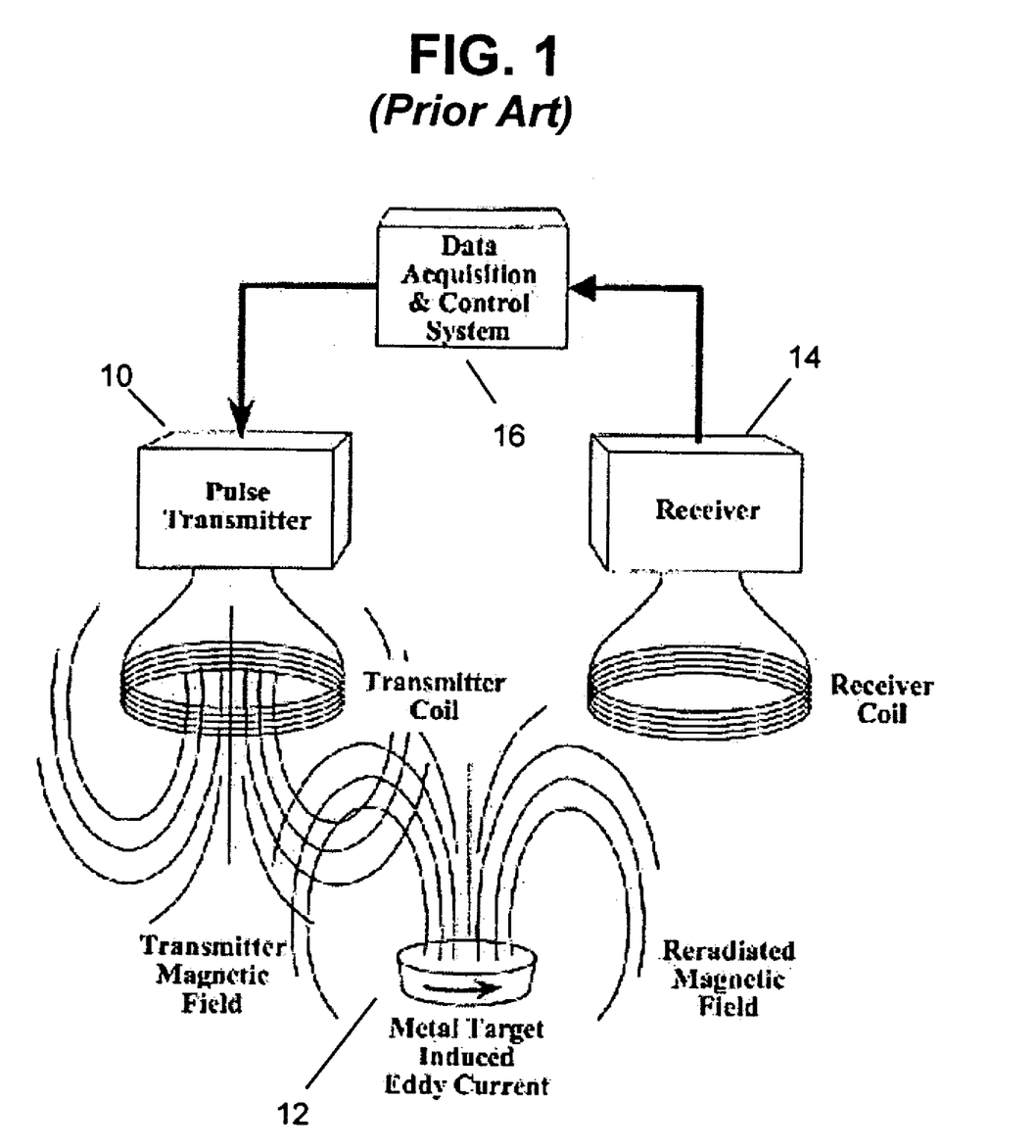
FIG. 1 illustrates a block diagram of a conventional pulsed EMI metal detector and method of operation.

FIG. 1 is a block diagram of a conventional pulsed EMI metal detector and method of operation. A current loop transmitter 10 is placed in the vicinity of the buried metal target 12, and a steady current flows in the transmitter 10 for a sufficiently long time to allow turn-on transients in the soil (soil eddy currents) to dissipate. The transmitter loop current is then turned off. The transmitter current is typically a pulsed waveform. For example, a square-wave, triangle or saw-tooth pulsed waveform, or a combination of different positive and negative current ramps.

According to Faraday's Law, the collapsing magnetic field induces an electromotive force (EMF) in nearby conductors, such as the metal target 12. This EMF causes eddy currents to flow in the conductor. Because there is no energy to sustain the eddy currents, they begin to decrease with a characteristic decay time that depends on the size, shape, and electrical and magnetic properties of the conductor. The decay currents generate a secondary magnetic field that is detected by a magnetic field receiver 14 located above the ground and coupled to the transmitter 10 via a data acquisition and control system 16.

Figure 2A:
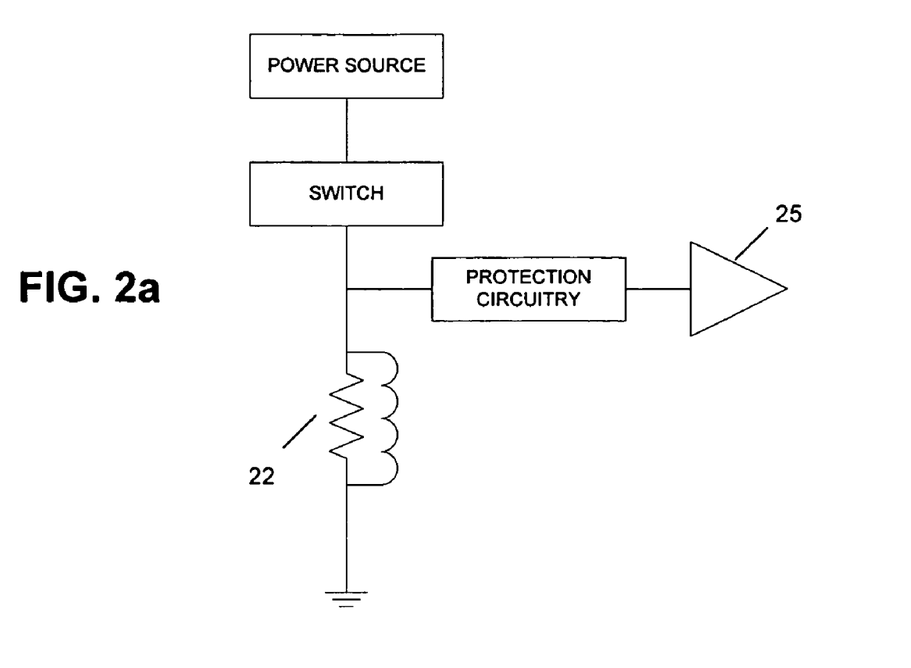
FIG. 2a illustrates a PIMD having a single transmit and receiver coil with multiple loops of wire forming the coil.
Figure 2B:
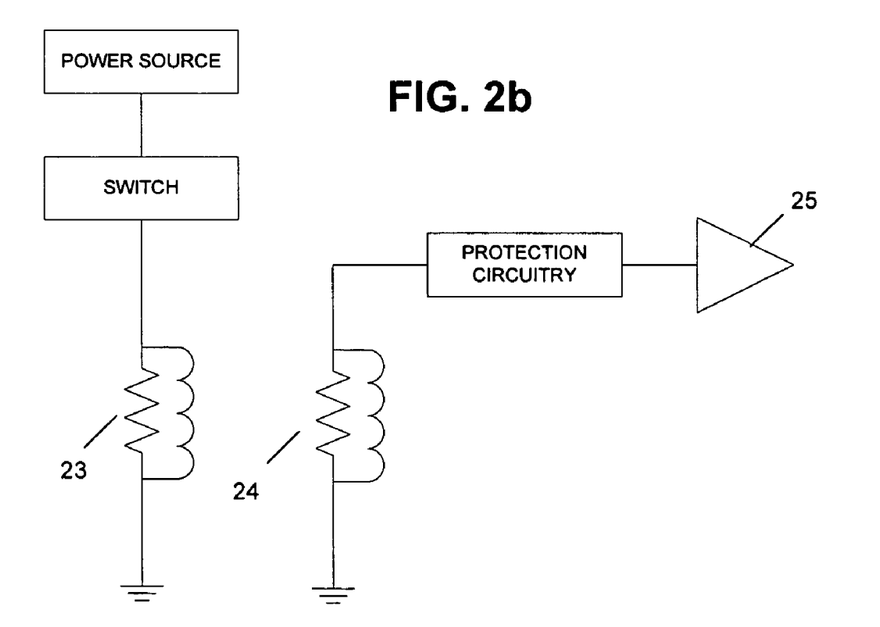
FIG. 2b illustrates a PIMD having a separate transmit and receiver coils with multiple loops of wire forming each coil.

Pulse induction metal detector (PIMD) antennas (transmitter and receiver coil) come in two basic types as shown in FIGS. 2a and 2b. The first type of PIMD uses a single transmit and receiver coil 22 with multiple loops of wire forming the coil (FIG. 2a). A current pulse is sent through the multiple turn coil 22 and the received metal detection signal is sensed by the same coil 22. The small voltage generated by the metal target is typically amplified by a high gain electronic amplifier 25 (typical gain factor of 100 to 1000). A protection circuit is provided to protect the sensitive amplifier from the high kick-back voltage pulse generated by switching the inductive coil off abruptly (V=L di/dt, where L is the inductance of the transmitter coil and di/dt is the slope of the current decay in the coil). The second type of PIMD uses a separate transmitter coil 23 and receiver coil 24, again, with multiple loops of wire forming the coils (FIG. 2b). This configuration provides isolation between the transmitter circuit and the receiver circuit and allows for more flexibility in the receiver coil 24 (e.g., different number of turns, size or differential coil configuration) and amplifier circuit design (e.g., single ended operation of electronics). The high gain amplifier 25 also sees the high kick-back voltage pulse generated by switching the transmitter coil 23 off abruptly and protection circuitry is needed to protect it from damage.

Two basic problems exist with prior art PIMDs. First, the high kick-back voltage of the transmitter coil 23 temporally "blinds" the receiver coil 24 from amplifying metal target signals near the turn-off time of the transmitter coil 23. The transmitter coil 23 is an impulse excitation to the receiver coil 24, and as such, the receiver coil 24 will have a decay voltage proportional to the inductance of the receive coil 24. Receiver coils typically have many turns for increased sensitivity and therefore, have relatively large inductances. These large decay voltages can persist for many microseconds and mask the signal from very small metal targets. Second, the protection circuitry typically has a delay time that also temporally "blinds" the receiver coil 24 from amplifying metal target signals near the turn-off time of the transmitter coil 23. Some protection circuitry uses switches to disconnect the receiver coil 24 from the amplifier 25 during the period that the kick-back voltage would cause amplifier saturation or damage. Low noise, high gain, low bandwidth amplifiers take time to come out of saturation which makes them "blind" to metal target signals. Other protection circuitry uses diodes to limit the voltage to the amplifier 25.

Figure 3:
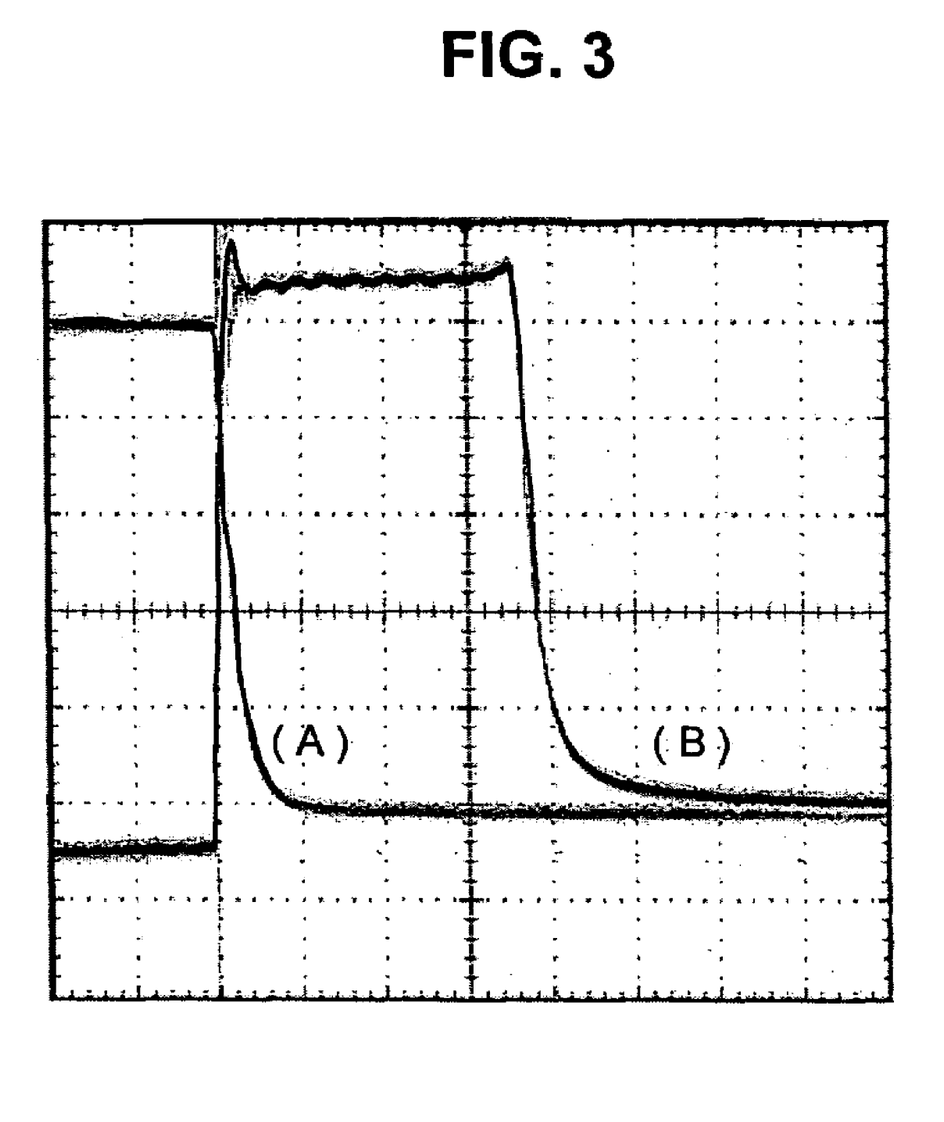

FIG. 3 illustrates the concept of "receiver blindness" with real data for the PIMD configuration of FIG. 2a. The display scale is 10 µs per division. Trace (A) shows a transmitter current of 5 A switching off abruptly in less than about 10 µs. Trace (B) shows the output from a fast-recovery amplifier (gain of 200) with fast recovery protection diodes typical of a PIMD. The large peak of Trace (B) is a saturation peak caused when the transmitter current is switched off. As the figure shows, the receiver coil has a large decay voltage from the transmitter pulse and the amplifier comes out of saturation at about 36 µs after transmitter turn-off. To sense metal signals, the time is closer to about 45 µs. Thus, metal signals and decay signatures are obscured during the 36 µs that the amplifier is in saturation.

What is needed is a system and/or method to sense metal signals closer to the transmitter turn-off time for a given PIMD coil configuration.

SUMMARY

The present invention describes a method of decreasing the response time or latency of a receiver coil having multiple loops and operating in a pulse induction metal detector. The pulse induction metal detector also includes a transmitter coil. The receiver coil is broken into segments during the time period when the transmitter coil is abruptly turned off and re-connected once the transmitter coil transients have decayed to an acceptable level.

The present invention also discloses a pulse induction metal detector that includes a pulse transmitter coil for generating and transmitting a first electromagnetic signal and a receiver coil for detecting and amplifying a second electromagnetic signal emitted by a nearby metal target in response to the first electromagnetic signal. The receiver coil is a coil of wire having multiple loops about a common axis. At least one switch is coupled with the coil of wire such that when the switch is in its open position, the coil of wire is a broken circuit. In this condition, the inductive properties of the receiver coil are minimized during abrupt transmitter coil turn off.

The number of switches per coil loop can be varied to achieve varying levels of sensitivity and isolation from the transmitter induced voltage transients. Moreover, the transmitter coil can be similarly broken during abrupt turn off. Or, both the transmitter and receiver coil can be broken during transmitter coil turn-off improving pulse induction metal detector sensitivity and performance even more.

BRIEF DESCRIPTION OF DRAWINGS

FIG. 3 illustrates the concept of "receiver blindness" using the coil configuration of FIG. 2a.

DETAILED DESCRIPTION

The goal of the present invention is to make the receive coil of a PIMD "invisible" during the transmitter turn-off transient. This is accomplished by minimizing the inductance of the receiver coil during this critical time. Receiver coil inductance minimization is achieved by breaking the conventional multiple turn receiver coil into individual wire segments so that current is restricted in a receiver loop during the transmitter turn-off transient. One or more electronic switches are used to form (or connect) wire segments into complete loops to complete the detection circuit for metal signal detection (via Faraday's Law) after the transmitter turn-off transients have decayed to an acceptable level that will allow the receiver to detect small metal targets. The inductance of the individual wire segments are in parallel during the transmitter turn-off time and hence, are very small compared to a multiple turn coil (e.g., a few micro-henries compared to hundreds of micro-henries).

Figure 4A:
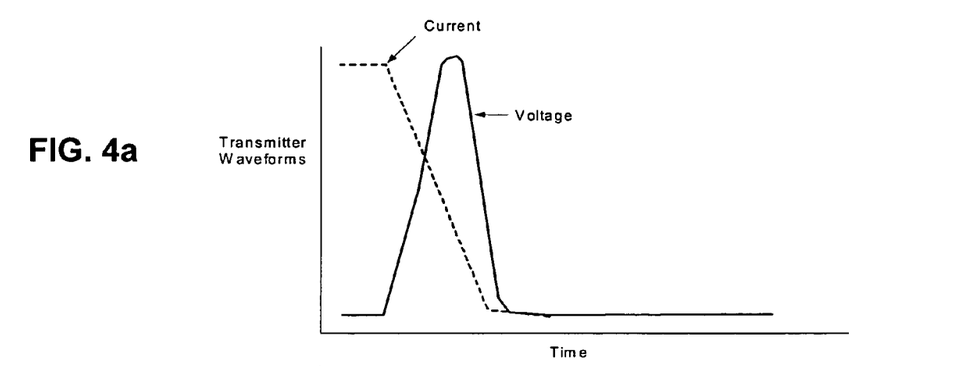
FIGS. 4a–d illustrate the timing of a typical pulse inductive switched coil receiver.
Figure 4B:
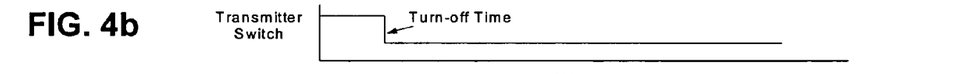
Figure 4C:
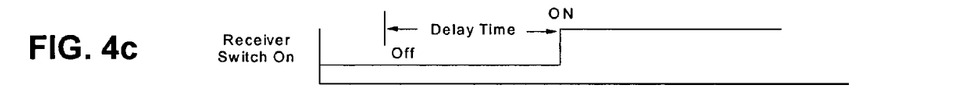
Figure 4D:
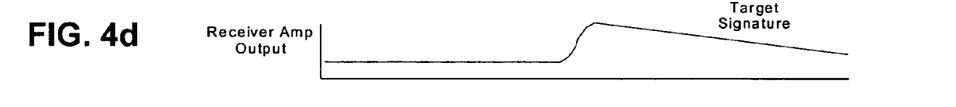

To better illustrate the problem, FIGS. 4a–d illustrate the timing of a pulse inductive switched coil receiver. The waveforms also apply to the present invention, for example, to the embodiment depicted in FIG. 5 and described below. FIG. 4a illustrates a transmitter current pulse turning off and a resulting voltage spike. For typical impulse induction metal detectors used by treasure hunters this voltage spike can be on the order of 150 volts or more and last for many microseconds. Commercial unexploded ordnance metal detectors that look for large deep metal targets, the transient time for the voltage spike can be many tens of microseconds. FIG. 4b illustrates a switch control timing diagram for the transmitter. The transmitter waveform of FIG. 4a results when the transmitter switch waveform of FIG. 4b transitions from ON to OFF, i.e., high to low. FIG. 4c illustrates a receiver coil/loop control timing diagram. During the OFF portion of the FIG. 4c waveform, the receiver coil/loop electronic switches are open, thereby breaking the otherwise continuous receiver coil into individual wire segments so as to reduce the overall inductance of the receiver coil compared to when it is a continuous wire loop. During the ON portion of the FIG. 4c waveform, the receiver coil/loop switches are closed (i.e., activated), thereby connecting the individual wire segments to form the continuous receiver loop having substantially more overall inductance than when it is configured as individual wire segments. Note that in FIG. 4c, the receiver coil/loop switches are activated (closed) after a delay time that allows the voltage from the transmitter coil to decay to a low level that will not saturate or damage the amplifier circuits. The control signals could be simultaneous as shown or with other timing arrangements such as slightly staggered to minimize charge injection voltages from the switches. Lastly, FIG. 4d illustrates the receiver coil output with a metal target signature. There will be a short ramp-up time that is proportional to the time constant of the receiver coil (i.e., proportional to the inductance and resistance of the coil). The properties of the receiver coil can be more easily tailored to the target signal properties.

Figure 5:
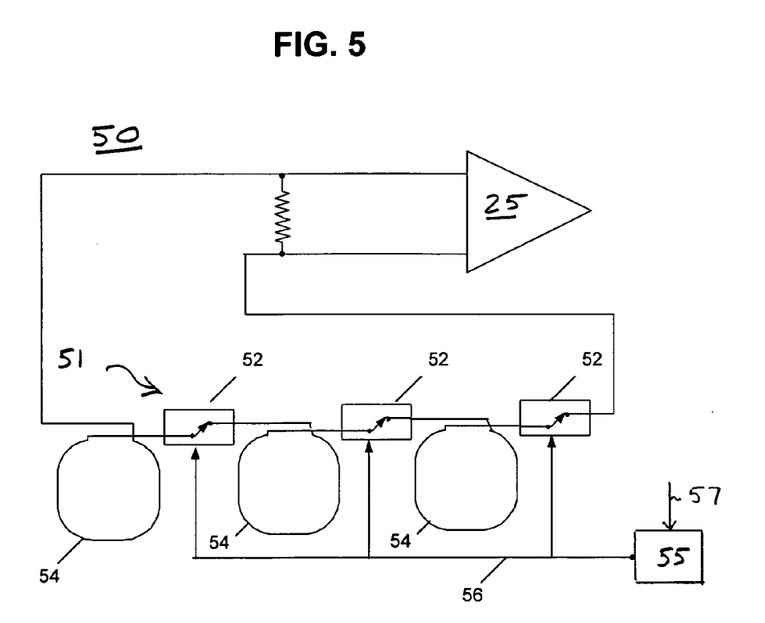
FIG. 5 illustrates a coil receiver according to the present invention having one switch per loop.

FIG. 5 illustrates one implementation of a coil receiver 50 including a receiver coil 51 according to the present invention. In PIMD embodiments of the present invention, for example, receiver coil 51 replaces coils 22 and 24 in the systems depicted in FIGS. 2a and 2b, respectively. Receiver coil 51 includes one switch 52 per loop 54. FIG. 5 diagrammatically separates the loops 54 for illustrative purposes only to more clearly show the switch 52 connections. In actuality, the loops are typically stacked one atop another on a common axis. The switches 52 illustrated are single pole single throw (SPST) though other switch types and configurations can be implemented.

A switch controller 55, such as a computer or other source, produces a control signal 56 used to control/operate the switch closures, i.e., to open and close the switches 52, responsive to one or more inputs 57 provided to the switch controller. Inputs 57 can include one or more of (i) a transmitter coil turn-off control signal, (ii) coil voltage, (iii) coil current, and (iii) a receiver amplifier output. In an embodiment, via control signal 56, controller 55 holds switches 52 open while the transmitter coil is turned off (as indicated by inputs 57), and then, after a predetermined time period, closes switches 52. In another embodiment, switch controller 55 can sense (using inputs 57) when the receiver has come out of a state of saturation caused by transmitter turn off, and then transition switches 52 from their open to closed positions.

In an embodiment, control signal 56 follows the timing of the FIG. 4c waveform relative to the other waveforms of FIGS. 4a and 4b, or waveforms (A) relative to waveforms (B), (C) and (D) of FIGS. 8 and 9, described below. When switches 52 are open responsive to control signal 56 (e.g., during the OFF or low portion of waveform FIG. 4c), the open switches break receiver coil 51 into multiple disconnected loops (e.g., wire segments) 54, which action prevents the receiver loops 54 from forming a complete circuit. On the other hand, when switches 52 are closed responsive to control signal 56 (e.g., during the ON or high portion of waveform FIG. 4c), the closed switches connect the individual wire segments 54 into a single continuous wire loop. Receiver coil 51 has substantially more inductance when it is configured as connected wire loops 54 (e.g., when switches 52 are closed) than when it is configured as multiple disconnected wire loops 54 (e.g., when switches 52 are opened). The electronic switches 52 can be electromechanical (e.g. reed relays) or integrated circuit (IC, e.g., analog switch or transistor) based. For fast operation, IC analog switches are preferred. The switching times for such switches are in the nanoseconds.

Figure 6A:
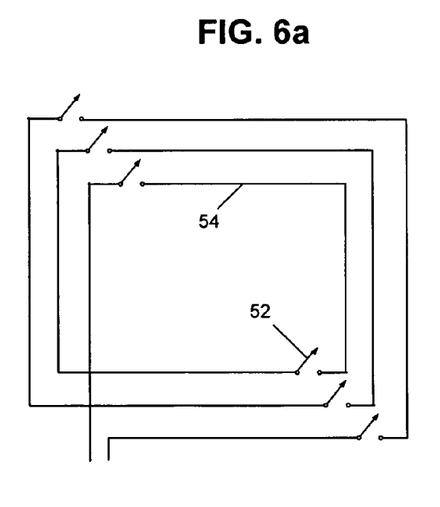
FIGS. 6a–b illustrate receiver coil configurations having multiple switches per loop.

FIG. 6a illustrates a receiver coil configuration that uses two switches 52 per loop 54.

Figure 6B:
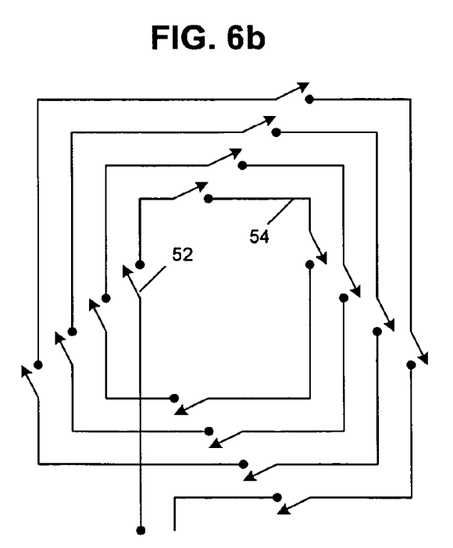

This configuration of the present invention shortens the lengths of the disconnected wire segments to further minimizes the inductance of the wire segments and also reduces the voltage across each switch 52 that is induced by the transmitter voltage transient. The wire segments act as electric field antennas and as such will generate a voltage across their length. This may be important from a practical point of view since low-cost, mass market IC analog switches do not tolerate voltages across their connections greater than a few volts. FIG. 6b illustrates a receiver coil embodiment having four (4) switches 52 per loop 54. The additional switches 52 further reduce the voltage seen by each switch 52.

Figure 7:
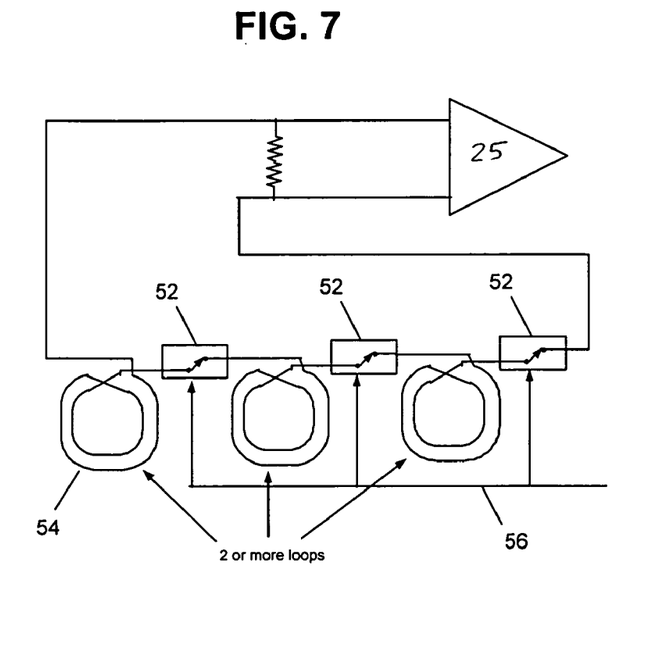
FIG. 7 illustrates a receiver coil configuration having multiple loops per switch.

FIG. 7 illustrates a receiver coil configuration that uses one switch 52 for every two or more loops 54. The configuration of FIG. 7 minimizes the inductance of the wire segments and reduces the voltage across switches 52 to a lesser extent than do configurations using a higher ratio of switches 52 to loops 54. The configuration of FIG. 7 does, however, minimize the inductance of the wire segments when compared to conventional PIMD coil configurations and has the advantage of requiring fewer switches 52 than does the configuration of FIG. 5.

Figure 8A:
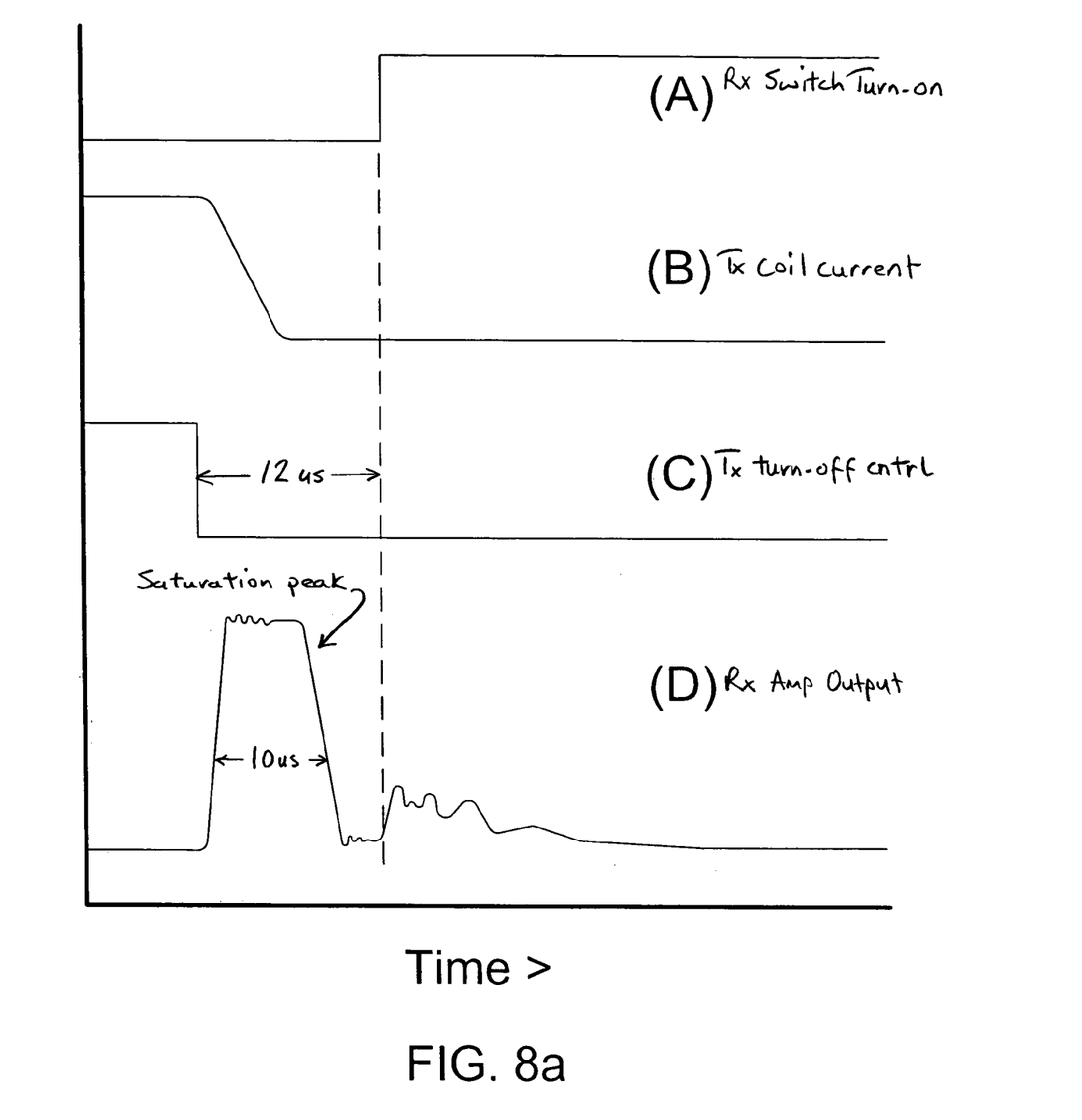
FIG. 8a is a graph illustrating decay transients of a prototype coil receiver with no target having one switch per turn.
Figure 8B:
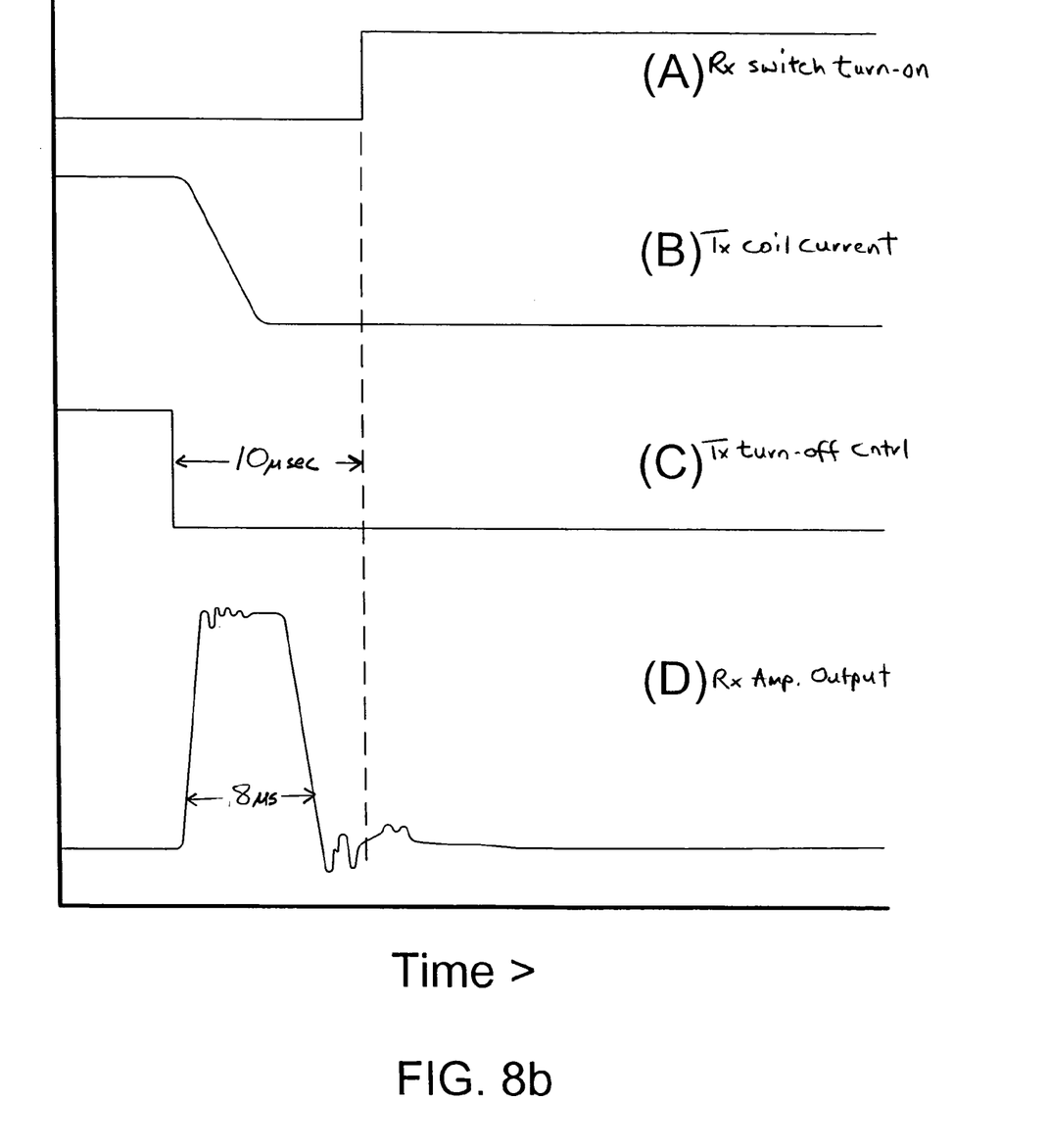
FIG. 8b is a graph illustrating decay transients of a prototype coil receiver with no target having four switches per turn.

FIG. 8a illustrates example timing waveforms (A), (B), (C) and (D) superimposed over time for a prototype PIMD configured as in FIG. 3 but using coil receiver 51, with no metal target, and that uses one switch per turn. The transmitter current is 5A. The time scale is 4 µs per division. The receiver coils are formed into complete loops 12 µs after transmitter turn-off. Trace (A) is the switch turn-on (activate) control signal (e.g., signal 56). Trace (B) is the current in the transmitter coil. Trace (C) is the transmitter turn-off control. Trace (D) is the amplifier output (gain 200), indicating an undesired 10 µs saturation peak caused by the transmitter turn-off. The receiver switches are closed (Trace (A)) 12 µs after the transmitter coil is turned-off (Trace (C)). Comparing FIG. 8a to FIG. 3, the switched amplifier output (Trace (D) in FIG. 8a) is not in saturation after 12 µs while the non-switched amplifier output of FIG. 3 is still in saturation after 30 µs. The advantageous decrease in saturation time from FIG. 3 to FIG. 8a is due to the receiver coil switches being opened, thus breaking the receiver coil into disconnected segments and creating a reduced overall coil induction, while the transmitter is switched off. Trace (D) in FIG. 8a indicates a small residue signal in the coil after the switches are closed. FIG. 8b illustrates results using four switches per turn. This graph shows an even more improved response (lower residue voltage) when compared to one switch per turn.

Figure 9:
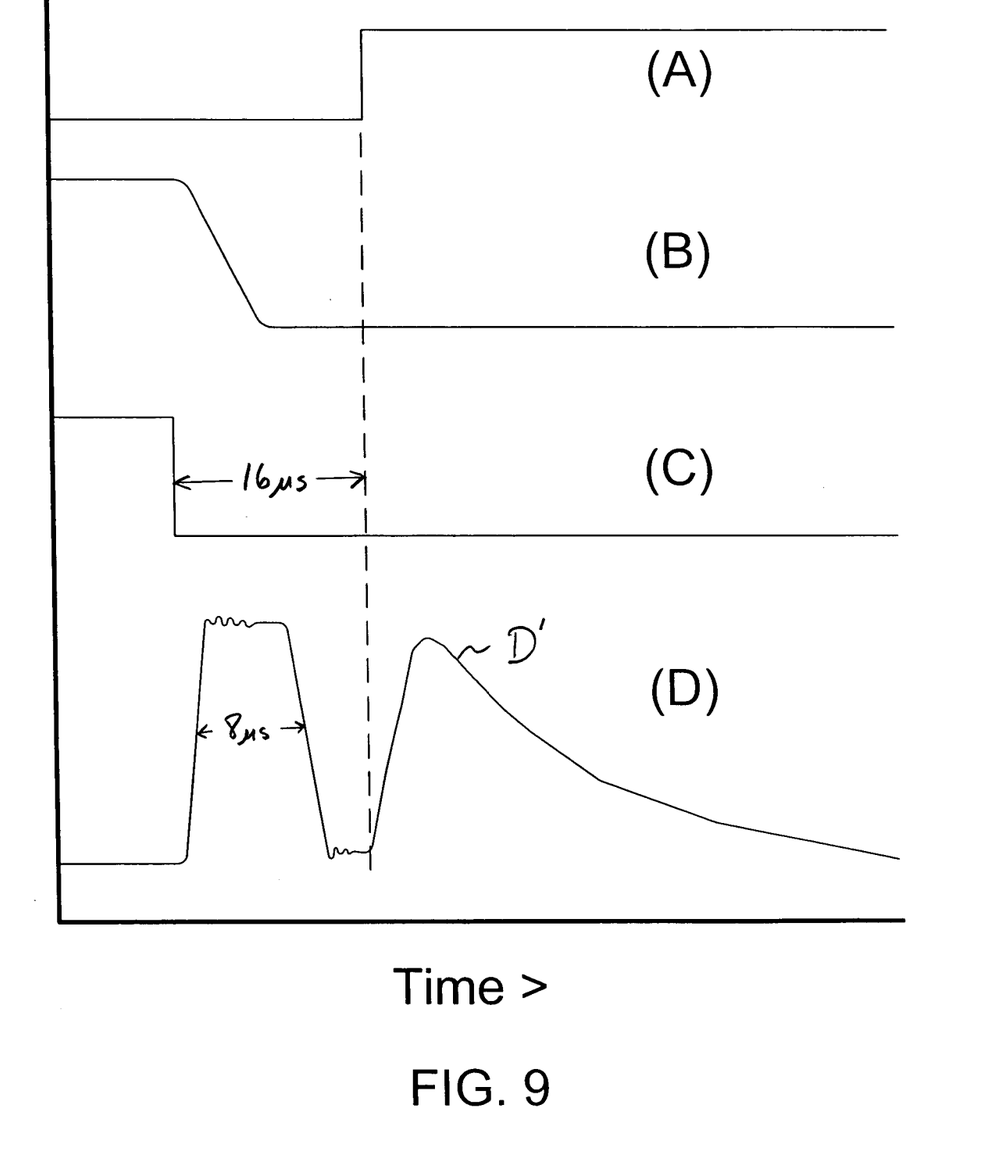
FIG. 9 is a graph illustrating decay transients of a prototype coil receiver having two switches per turn, a 16 μs delay, and a metal target signature.

FIG. 9 illustrates data for a receiver coil having two switches per turn and using a 16 µs delay between transmitter turn-off (Trace (C)) and Receiver switch turn-on/closure (Trace (A)). The receiver coil is in the presence of a metal target, and Trace (D) indicates a target signature D'. The trace descriptions are the same as in FIG. 8. The target signature D' as near to the transmitter turn-off time as indicated in FIG. 9 would have been obscured by the amplifier saturation in a conventional non-switched receiver coil, as shown in FIG. 3. Note in FIG. 9 that the receiver amplifier advantageously comes out of saturation before the metal signature time period. Thus, the receiver is able to detect target signature D'.

Other configurations can be implemented to achieve different purposes. For example, instead of SPST switches, one could use double pole, single throw (DPST) switches (or other configurations) to connect the receiver in a configuration that had a few coil turns during one portion of the time period (after the transmitter turn-off time) and a different number of coil turns at a later time. For example, late in the decay time of a target, the signal is very weak. One may boost the signal by having more coil turns to sense the weak magnetic field late in the decay process.

Figure 10:
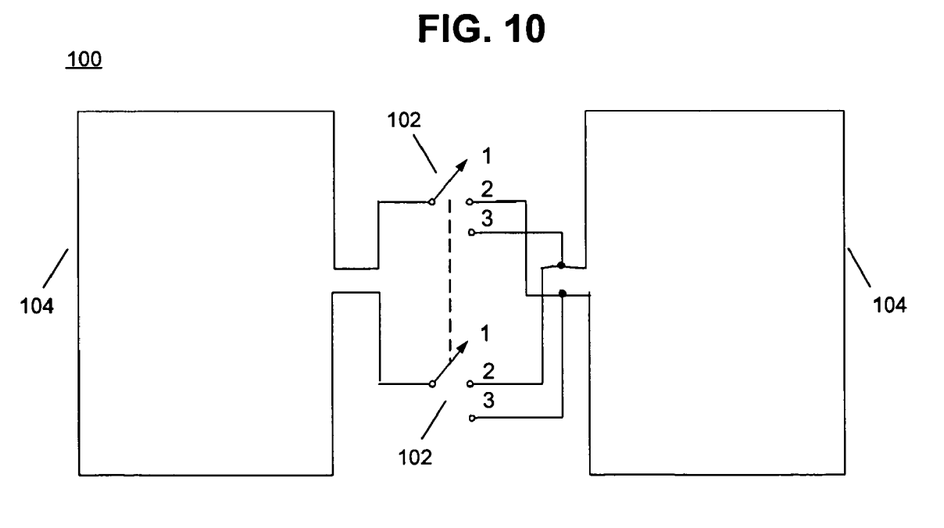
FIG. 10 illustrates a different multiple coil application where a three pole, double throw, (TPDT) switch is utilized.

FIG. 10 illustrates a different multiple coil configuration 100 where three pole, double throw, (TPDT) switches 102 are utilized. There are two co-planar coils 104 in this configuration. With the switch in position (1), the coils are not connected as a closed loop and there is minimal inductance. When the switches 102 are put into position (2), the co-planar coils 104 are connected in a differential configuration (i.e., classic figure eight or gradiometer mode) and the windings are wound in the opposite sense with respect to the signal substrate. This is useful for small metal targets since ground response and far-field noise are minimized. When the switches 102 are in position (3), the co-planar coils 104 are wound in the same sense as the signal substrate and the signals add. This is useful for large deep metal targets when the two coils form an effective larger coil aperture with improved depth sensitivity.

The coil configuration in FIG. 10 can be implemented in a stacked multiple loop configuration for improved sensitivity.

The foregoing has described PIMD configurations in which the coil receiver has been selectively broken during transmitter coil turn-off. In an alternative, the transmitter coil can be broken apart in the same manner as described for the receiver coil. Breaking the transmitter coil as a means for transmitter coil turn-off reduces the high kick-back voltage that is generated when switching the transmitter coil off abruptly. The kick-back voltage of an unbroken transmitter coil is greater than that of a "sectioned" or broken transmitter coil. Any of the above-described receiver coils embodiments may also be used as transmitter coils. For example, coil 51 or the switched coils of FIGS. 6, 7 and 10 can replace transmitter coil 23 in the PIMD of FIG. 2b. Yet another configuration for a PIMD according to the present invention utilizes switches to break both the transmitter and receiver coils during transmitter coil turn-off. Sectioning both coils provides an increased benefit when compared to sectioning either one or the other coil.

The concept of sectioning the transmitter coil is identical to sectioning the receive coil. Adjustments, in terms of switch components and the like, can be made to account for the higher power associated with the transmitter coil. Thus, different types or configurations of switches can be used for the transmitter coil. The control signal for the transmitter coil switches and receiver coil switches can be shared or separately administered.

It is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

The invention claimed is:

1. A pulse induction metal detector comprising:
a pulse transmitter for generating and transmitting a first electromagnetic signal; and
a receiver for detecting and amplifying a second electromagnetic signal emitted by a nearby metal target in response to the first electromagnetic signal;
wherein the receiver further comprises:
a coil of wire having multiple loops; and
at least one switch coupled with the coil of wire such that the multiple loops form
(i) a closed circuit when the at least one switch is closed, and
(ii) an open circuit having less inductance than the closed circuit when the at least one switch is open.

2. The pulse induction metal detector of claim 1 further comprising switch control means for controlling the opening and closing of the at least one switch such that the at least one switch is open for a period of time following a transmitter turn off and then closed.

3. The pulse induction metal detector of claim 1 wherein the at least one switch comprises one switch per loop of wire.

4. The pulse induction metal detector of claim 1 wherein the at least one switch comprises multiple switches per loop of wire.

5. The pulse induction metal detector of claim 1 further comprising multiple loops of wire per switch.

6. A method of decreasing the latency of a receiver coil operating in a pulse induction metal detector that includes a transmitter coil, the receiver coil comprising multiple loops in the coil, the method comprising:
breaking the receiver coil into segments when the transmitter coil is abruptly turned off; and
re-connecting the receiver coil into a closed circuit once the transmitter coil transients have decayed to an acceptable level.

7. The method of claim 6 further comprising breaking the receiver coil into wire segments that correspond to one break per loop.

8. The method of claim 6 further comprising breaking the receiver coil into wire segments that correspond to multiple breaks per loop.

9. The method of claim 6 further comprising breaking the receiver coil into wire segments that correspond to multiple loops per break.

10. A method of decreasing the latency of a receiver coil operating in a pulse induction metal detector that includes a transmitter coil, the transmitter coil comprising multiple loops in the coil, the method comprising:
breaking the transmitter coil into segments when the transmitter coil is abruptly turned off; and
re-connecting the transmitter coil into a closed circuit once the transmitter coil transients have decayed to an acceptable level.

11. The method of claim 10 further comprising breaking the transmitter coil into wire segments that correspond to one break per loop.

12. The method of claim 10 further comprising breaking the transmitter coil into wire segments that correspond to multiple breaks per loop.

13. The method of claim 10 further comprising breaking the transmitter coil into wire segments that correspond to multiple loops per break.

14. A transmitter coil adapted for use within a pulse induction metal detector, said transmitter coil comprising:
a coil of wire having multiple loops; and
at least one switch coupled with the coil of wire such that the multiple loops form
(i) a closed circuit when the at least one switch is closed, and
(ii) an open circuit having less inductance than the closed circuit when the at least one switch is open,
wherein the at least one switch comprises multiple switches per loop of wire.

15. A receiver coil adapted for use within a pulse induction metal detector, said receiver coil comprising:
a coil of wire having multiple loops; and
at least one switch coupled with the coil of wire such that the multiple loops form
(i) a closed circuit when the at least one switch is closed, and
(ii) an open circuit having less inductance than the closed circuit when the at least one switch is open.
wherein the at least one switch comprises multiple switches per loop of wire.

16. A pulse induction metal detector comprising:
a pulse transmitter for generating and transmitting a first electromagnetic signal; and
a receiver for detecting and amplifying a second electromagnetic signal emitted by a nearby metal target in response to the first electromagnetic signal;
wherein the pulse transmitter further comprises:
a coil of wire having multiple loops; and
at least one switch coupled with the coil of wire such that the multiple loops form
(i) a closed circuit when the at least one switch is closed, and
(ii) an open circuit having less inductance than the closed circuit when the at least one switch is open.

17. The pulse induction metal detector of claim 16 further comprising switch control means for controlling the opening and closing of the at least one switch such that the at least one switch is opened for a period of time following an abrupt transmitter turn off.

18. The pulse induction metal detector of claim 16 wherein the at least one switch comprises one switch per loop of wire.

19. The pulse induction metal detector of claim 16 wherein the at least one switch comprises multiple switches per loop of wire.

20. The pulse induction metal detector of claim 16 further comprising multiple loops of wire per switch.

21. A pulse induction metal detector comprising:
a pulse transmitter for generating and transmitting a first electromagnetic signal; and
a receiver for detecting and amplifying a second electromagnetic signal emitted by a nearby metal target in response to the first electromagnetic signal;
wherein
the pulse transmitter further comprises:
a transmitter coil of wire having multiple loops; and
at least one transmitter switch coupled with the transmitter coil of wire such that the transmitter multiple loops form
a closed circuit when the at least one transmitter switch is closed, and an open circuit having less inductance than the closed circuit when the at least one transmitter switch is open, and the receiver further comprises:
  a receiver coil of wire having multiple loops; and
  at least one receiver switch coupled with the receiver coil of wire such that the receiver multiple loops form
    a closed circuit when the at least one receiver switch is closed, and
    an open circuit having less inductance than the closed circuit when the at least one receiver switch is open.

22. The pulse induction metal detector of claim 21 further comprising switch control means for controlling the position of the at least one receiver switch such that the at least one switch is opened for a period of time following an abrupt transmitter turn off.

* * * * *